(12) United States Patent
Hoang

(10) Patent No.: US 9,635,420 B2
(45) Date of Patent: Apr. 25, 2017

(54) ENERGY SAVING SET TOP BOX

(71) Applicant: EchoStar Technologies L.L.C., Englewood, CO (US)

(72) Inventor: Doug T. Hoang, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 29 days.

(21) Appl. No.: 14/074,140

(22) Filed: Nov. 7, 2013

(65) Prior Publication Data

US 2015/0128203 A1    May 7, 2015

(51) Int. Cl.

| H04H 60/33 | (2008.01) |
|---|---|
| H04N 21/443 | (2011.01) |
| H04N 21/442 | (2011.01) |
| G06F 1/32 | (2006.01) |
| H04H 20/42 | (2008.01) |
| H04H 60/45 | (2008.01) |
| H04H 60/65 | (2008.01) |
| H04N 21/41 | (2011.01) |
| H04H 40/90 | (2008.01) |

(52) U.S. Cl.
CPC ....... *H04N 21/4436* (2013.01); *G06F 1/3231* (2013.01); *G06F 1/3234* (2013.01); *G06F 1/3268* (2013.01); *G06F 1/3287* (2013.01); *H04H 20/426* (2013.01); *H04H 60/45* (2013.01); *H04H 60/65* (2013.01); *H04N 21/4126* (2013.01); *H04N 21/4131* (2013.01); *H04N 21/44218* (2013.01); *H04N 21/44227* (2013.01); *H04H 40/90* (2013.01)

(58) Field of Classification Search
CPC .... H04N 21/40; H04N 21/41; H04N 21/4126; H04N 21/422; H04N 21/44227; H04N 21/4436; G06F 1/3203; G06F 1/3231; G06F 1/3234; G06F 1/3268; G06F 1/3287
USPC ................ 725/9–13, 68, 139, 141, 151, 153
See application file for complete search history.

(56) References Cited

U.S. PATENT DOCUMENTS

| 5,446,904 | A  * | 8/1995 | Belt et al. ...................... 713/323 |
| 8,601,529 | B1 * | 12/2013 | Barzegar et al. ............. 725/150 |
| 8,806,530 | B1 * | 8/2014 | Izdepski et al. ................ 725/34 |
| 8,938,497 | B1 * | 1/2015 | Wang ............... H04N 21/44227 709/204 |
| 2004/0051813 | A1* | 3/2004 | Marmaropoulos H04N 21/4436 348/553 |
| 2005/0160464 | A1 |  7/2005 | Yamaguchi |
| 2005/0239445 | A1* | 10/2005 | Karaoguz ........ H04N 21/42676 455/414.1 |
| 2009/0125970 | A1* | 5/2009 | Fitzpatrick et al. .......... 725/151 |
| 2009/0167855 | A1* | 7/2009 | Kummer ...................... 348/114 |

(Continued)

FOREIGN PATENT DOCUMENTS

JP        2013186707 A    9/2013

OTHER PUBLICATIONS

European Search Report for EP Application No. 14192367.2-1905 dated Mar. 16, 2015 (6 pages).

*Primary Examiner* — Jeremy Duffield
(74) *Attorney, Agent, or Firm* — Bejin Bieneman PLC

(57) ABSTRACT

A system includes a satellite receiver and a set top box. The set top box is configured to receive signals from the satellite receiver and output a signal to a display device. The set top box detects whether at least one mobile device is near the set top box and enables a standby mode when no mobile devices are detected.

15 Claims, 2 Drawing Sheets

(56) References Cited

U.S. PATENT DOCUMENTS

2010/0014005 A1* 1/2010 Yano ................ H04N 21/42207
                                                          348/734
2011/0157468 A1* 6/2011 Dai ................................. 725/40
2014/0075488 A1* 3/2014 Christudass et al. ......... 725/114

* cited by examiner

ENERGY SAVING SET TOP BOX

BACKGROUND

Numerous household devices draw power when not being used for their primary purposes. For example, microwaves and stoves draw power to display a digital clock, even when the microwave or stove is not being used for heating food. Some devices even draw power when the device appears to be turned off to, e.g., maintain an internal memory and/or user settings. Consumers who wish to reduce their energy consumption will sometimes unplug unused devices. Doing so, however, often means slow boot times and having to reconfigure settings each time the device is plugged in and turned on.

DETAILED DESCRIPTION

An exemplary system includes a satellite receiver and a set top box. The set top box is configured to receive signals from the satellite receiver and output a signal to a display device. The set top box detects whether at least one mobile device is near the set top box and enables a standby mode when no mobile devices are detected. An exemplary set top box includes a media content interface device configured to receive media content signals, a device detector configured to detect at least one mobile device near the set top box, and a processing device configured to enable the standby mode if no mobile devices are detected.

The system shown in the FIGS. may take many different forms and include multiple and/or alternate components and facilities. While an exemplary system is shown, the exemplary components illustrated are not intended to be limiting. Indeed, additional or alternative components and/or implementations may be used.

Figure 1:
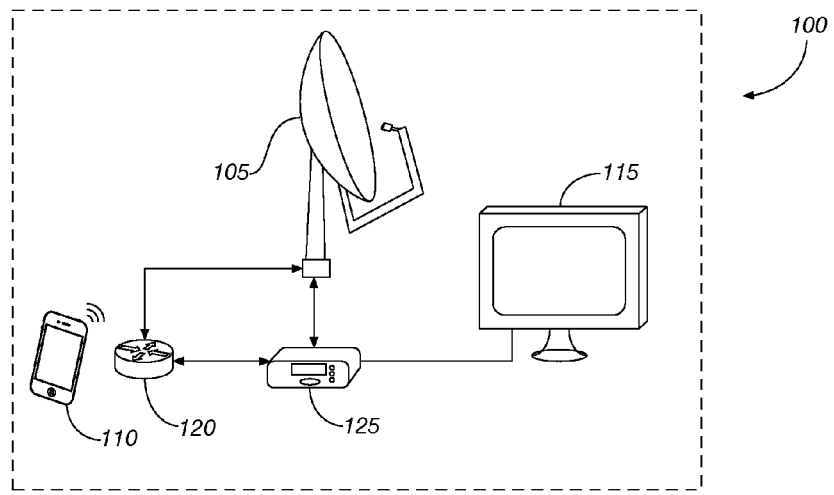
FIG. 1 illustrates an exemplary system having a set top box with an energy saving mode.

As illustrated in FIG. 1, the system 100 includes a satellite receiver 105, a mobile device 110, a display device 115, a router 120, and a set top box 125. The satellite receiver 105, the mobile device 110, the display device 115, and the set top box 125 may sometimes be located at a customer premises 130, such as a customer's home or place of business.

The satellite receiver 105 may include a satellite dish having a generally parabolic antenna configured to receive microwave signals from communication satellites (not shown). The signals received by the satellite receiver 105 may represent media content including television, video-on-demand, games, Internet, or the like. The parabolic antenna directs the received signals onto a feedhorn that converts received signals to a lower frequency range, as discussed in greater detail below. The satellite receiver 105 may be located at or near the customer premises 130.

The mobile device 110 may include any portable device that can wirelessly communicate with the set top box 125. Examples of mobile devices 110 may include a mobile phone, a laptop computer, a tablet computer, or the like. The mobile device 110 may be configured to communicate using any number of communication protocols such as Bluetooth®, WiFi, or both. In some instances, the mobile device 110 may be configured to pair or register with the set top box 125. Although only one mobile device 110 is shown, the system 100 may include any number of mobile devices 110.

The display device 115 may include any device configured to present media content. Examples of display devices 115 may include a television or computer monitor. The display device 115 may be configured to receive media content signals output by the set top box 125 and present images based on the signals received. The display device 115 may be configured for wired or wireless communication with the set top box 125.

The router 120 may be configured to facilitate communication between the set top box 125 and other devices, such as the mobile device 110. The router 120 may be configured to communicate with the set top box 125 and/or the mobile device 110 wirelessly or through a wired communication. For example, wireless communication may be in accordance with a communication protocol such as WiFi and wired communication may be in accordance with a protocol such as Ethernet. In some possible approaches, each mobile device 110 may be configured to register with the router 120. The router 120 may be configured to output a list of registered devices to, e.g., the set top box 125.

The set top box 125 may be configured to process signals received from the satellite receiver 105 and output media content signals to the display device 115. Moreover, as discussed in greater detail below with reference to FIG. 2, the set top box 125 may be configured to detect whether one or more mobile devices 110 are near the set top box 125. One way to determine proximity to the set top box 125 is to determine whether any mobile devices 110 are in wireless communication with the set top box 125. The set top box 125 may be configured to wirelessly communicate with one or more mobile devices 110 using, e.g., Bluetooth®, WiFi, Ethernet, or any other wireless communication protocol. When no mobile devices 110 are detected, the set top box 125 may be configured to enter into a standby mode. When the standby mode is enabled, various components of the set top box 125 may be disabled to conserve power. The set top box 125 may detect that no mobile devices 110 are near any time users of the mobile devices 110 leave the customer premises 130 and take the mobile devices 110 with them. The set top box 125 may be configured to pair with any number of mobile devices 110.

Figure 2:
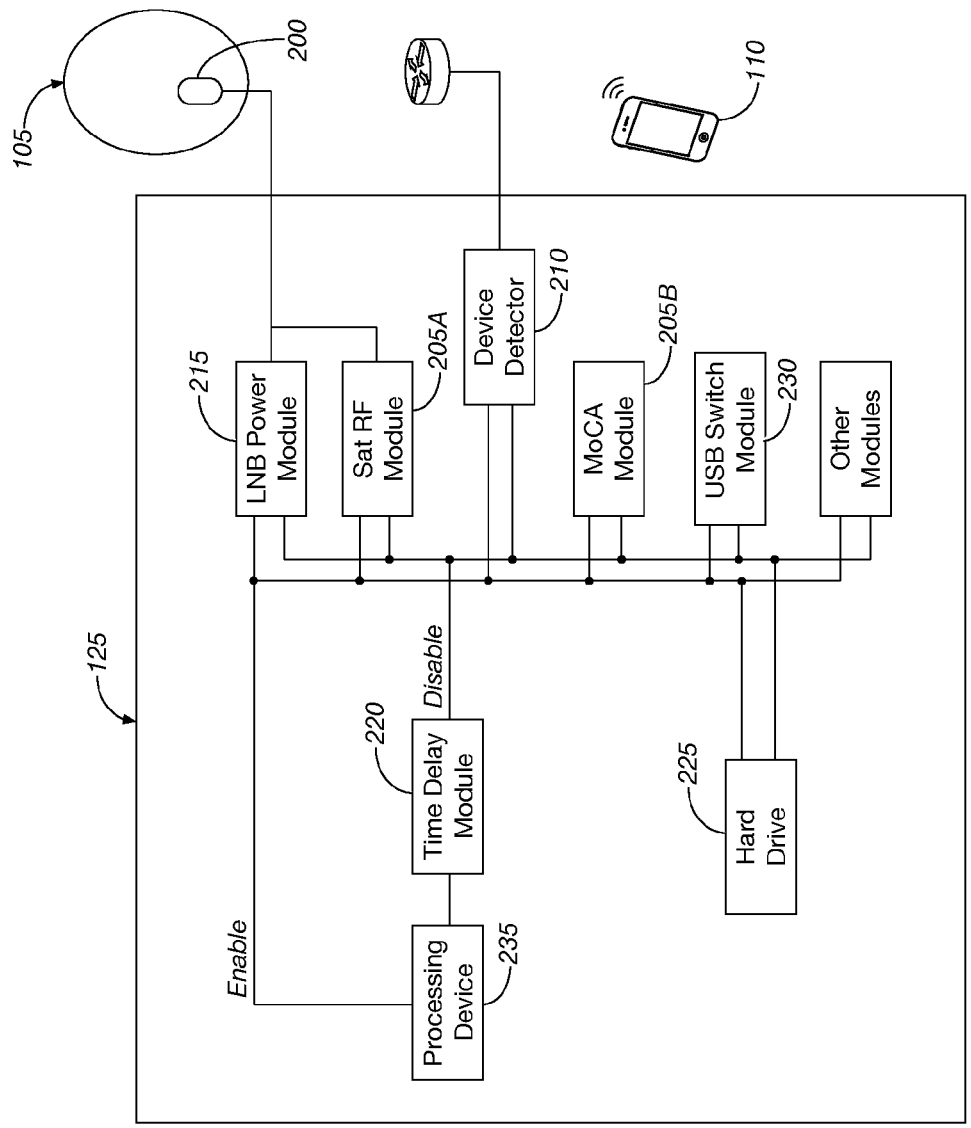
FIG. 2 illustrates an exemplary set top box with an energy saving mode.

FIG. 2 is a block diagram showing exemplary components of the system 100 of FIG. 1. As illustrated, the satellite receiver 105 includes a low-noise block 200 and the set top box 125 includes a media content interface device 205, a device detector 210, low-noise block power module 215, a time delay module 220, a hard drive 225, a USB switch module 230, and a processing device 235. The satellite receiver 105 and the set top box 125 may include other components as well.

The low-noise block 200 may be configured to down-convert received microwave signals to intermediate frequencies. The low-noise block 200 may include components such as a low-noise amplifier, a frequency mixer, a local oscillator, and an intermediate frequency amplifier. The low-noise block 200 may output processed signals to, e.g., the media content interface device 205 of the set top box 125. In some possible approaches, the low-noise block 200 may be powered by the set top box 125, and in particular, the low-noise block power module 215.

The media content interface device 205 may be configured to receive processed media content signals from the low-noise block 200. In one possible approach, the media content interface device 205 may include a satellite radio frequency (RF) module 205A that receives media content signals from the low-noise block 200. The media content interface device 205 may additionally or alternatively process signals according to a protocol established by the Multimedia over Coaxial Alliance (MoCA) at MoCA module 205B. The media content interface device 205 may be enabled and/or temporarily disabled based on signals received from, e.g., the processing device 235.

The device detector 210 may be configured to detect the presence of one or more mobile devices 110. The device detector 210 may be configured to wirelessly communicate with one or more mobile devices 110 in accordance with a communication standard such as, e.g., Bluetooth®, WiFi, or Ethernet. Although only one mobile device 110 is shown in FIG. 2, the device detector 210 may be configured to detect the presence of any number of mobile devices 110. For instance, the device detector 210 may be configured to receive the list identifying registered devices generated by the router 120. Since the range of the router 120 may be relatively limited, the device detector 210 may be configured to determine that any mobile device 110 registered with the router 120 must be near the set top box 125. Similarly, the device detector 210 may determine that a mobile device 110 is near the set top box 125 if the mobile device 110 is presently paired with the device detector 210 in accordance with the Bluetooth® protocol since Bluetooth® has a relatively limited range. The device detector 210 may be configured to output signals representing the presence or absence of at least one mobile device 110.

The low-noise block power module 215 may be configured to provide power to the low-noise block 200 of the satellite receiver 105. The low-noise block 200 may be enabled only when the low-noise block power module 215 provides power to the low-noise block 200. Thus, temporarily disabling the low-noise block power module 215 may by extension temporarily disable the low-noise block 200. The low-noise block power module 215 may be enabled and/or disabled based on signals received from, e.g., the processing device 235.

The time delay module 220 may be configured to relay received signals only after a predetermined amount of time has elapsed. For example, the time delay module 220 may be configured to receive a command signal disabling one or more components of the set top box 125 generated by the processing device 235. The time delay module 220 may hold the command signal for the predetermined amount of time, such as for 10 minutes, before relaying the command signal to the components that are to be disabled. Thus, components may be disabled the predetermined amount of time (e.g., 10 minutes) after the processing device 235 outputs the command signal. The time delay module 220 may help prevent components of the set top box 125 from going into the standby mode inadvertently, such as when the device detector 210 momentarily loses communication with all nearby mobile devices 110, or when a user briefly takes his or her mobile device 110 out of the range of the set top box 125 but returns a short time later, such as if the user briefly steps outside of the customer premises 130.

The hard drive 225 may be configured to store data, including media content, locally at the set top box 125. For example, the set top box 125 may be configured to store recorded media content, live media content, live media content with a brief (e.g., 2-second) delay, games, music, pictures, etc. In some implementations, the hard drive 225 may include a hard disk drive, a solid-state drive, or any other medium for storing data. The hard drive 225 may be enabled and/or temporarily disabled based on signals received from, e.g., the processing device 235.

The USB switch module 230 may be configured to allow the set top box 125 to interface with other devices configured to communicate according to the Universal Serial Bus (USB) protocol, including other set top boxes, video game consoles, DVD® or Blueray® players, diagnostic devices, a display device 115, an external hard drive, etc. The USB switch may be enabled and/or temporarily disabled based on signals received from, e.g., the processing device 235.

The processing device 235 may be configured to receive the signals representing the presence or absence of one or more mobile devices 110 output by the device detector 210. If a signal indicating the presence of at least one mobile device 110 is received, the processing device 235 may cause the components of the set top box 125 to operate under normal operating conditions (i.e., a non-standby mode). If, however, the signal received from the device detector 210 indicates that no mobile devices 110 are present, the processing device 235 may be configured to cause the set top box 125 to operate in the standby mode.

To enable the standby mode, the processing device 235 may output a command signal, such as a disable signal, that causes one or more components to become temporarily disabled. The processing device 235 may disable all components at the same time or in stages. For example, the processing device 235 may disable the low-noise block power module 215 and the USB switch module 230 prior to disabling the hard drive 225. As discussed above, the disable signal may be output to the time delay module 220 prior to being relayed to various components of the set top box 125. This way, the set top box 125 will not enter the standby mode immediately upon the absence of a mobile device 110. Rather, with the time delay module 220, the set top box 125 may enter the standby mode after a predetermined amount of time (e.g., 10 minutes) has elapsed, which may prevent the set top box 125 from going into the standby mode inadvertently or when the user with the mobile device 110 briefly steps out of the customer premises 130.

To further conserve power, even the processing device 235 may go into a sleep mode or a standby mode, e.g., after the other components have been disabled. The processing device 235 may be enabled (i.e., "woken up") by signals generated by the device detector 210. The device detector 210 may remain enabled when the set top box 125 is operating in the standby mode. Thus, the device detector 210 may determine when a mobile device 110 has returned to an area near the set top box 125 regardless of whether the other components of the set top box 125 have been temporarily disabled. When a mobile device 110 is detected, the device detector 210 may output a representative signal to the processing device 235. The processing device 235 may become enabled, if in a sleep or standby mode, and output one or more command signals to enable the components of the set top box 125. Moreover, the processing device 235 may be enabled based on a user input provided to, e.g., a remote control (not shown). This way, the user can override the standby mode in instances where communication with the mobile device 110 is lost for reasons other than the user leaving the customer premises 130.

In general, computing systems and/or devices, such as the mobile device 110, the router 120, and the set top box 125, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Cali.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3:
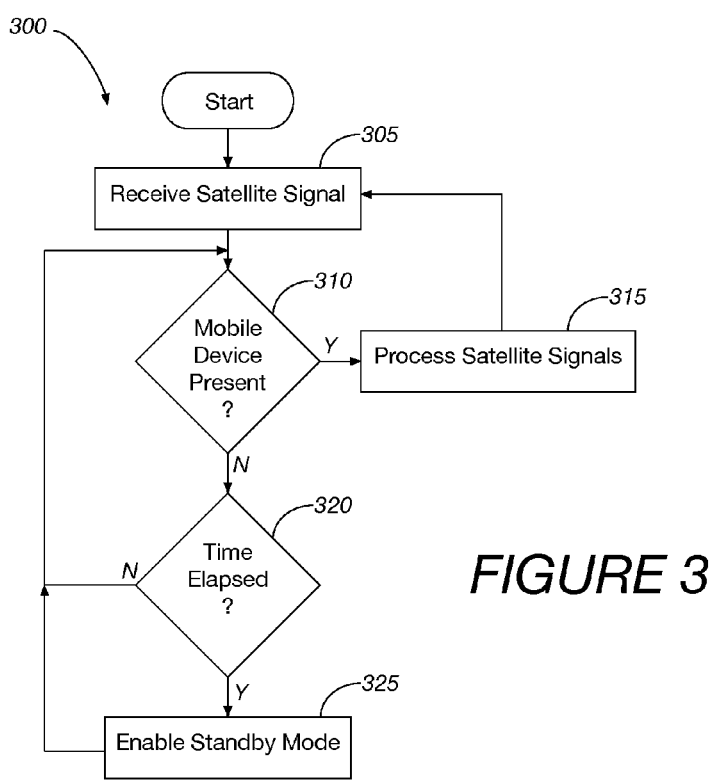
FIG. 3 is a flowchart of an exemplary process that may be implemented by a set top box with an energy saving mode.

FIG. 3 is a flowchart of an exemplary process 300 that may be implemented on the set top box 125.

At block 305, the set top box 125 may receive satellite signals from the satellite receiver 105. For instance, signals may be processed by the low-noise block 200 and transmitted to the media content interface device 205.

At decision block 310, the set top box 125 may determine whether any mobile devices 110 are located near the set top box 125. The device detector 210 may determine the proximity of one or more mobile devices 110 based on whether the mobile device 110 is in wireless communication with the set top box 125 either directly or through a router 120. If at least one mobile device 110 is near the set top box 125, the process 300 may continue at block 315. If no mobile devices 110 are near the set top box 125, the process 300 may continue at decision block 320.

At block 315, the set top box 125 may proceed to process and output media content signals to, e.g., the display device 115. That is, the media content interface device 205 may process signals according to various standards and output signals to the display device 115 for presentation to one or more users. If the display device 115 is turned off, however, the set top box 125 may perform other actions such as updating program guides, updating software and/or firmware, recording media content, etc.

At decision block 320, the set top box 125 may determine whether a predetermined amount of time has elapsed. The predetermined amount of time may be applied by the time delay block to prevent the set top box 125 from inadvertently entering the standby mode after, e.g., the user briefly steps away from the customer premises 130 with the mobile device 110 or communication with the mobile device 110 is lost for a brief period of time. If the predetermined amount of time has elapsed, the process 300 may continue at block 325. If the predetermined amount of time has not elapsed, the process 300 may return to block 310 in case the mobile device 110 is returned to the customer premises 130.

At block 325, the set top box 125 may enter the standby mode. The processing device 235 may enable the standby mode by temporarily disabling one or more components of the set top box 125. The components may be temporarily disabled simultaneously or in stages. For example, the processing device 235 may disable the low-noise block 200 followed by the hard drive 225. Moreover, the processing device 235 may enter a sleep mode or a standby mode. The process 300 may continue at block 310 so that the set top box 125 may become enabled if one or more mobile devices 110 are returned to the customer premises 130.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
   a satellite receiver associated with a low-noise block; and
   a set top box programmed to receive signals from the satellite receiver and output a signal to a display device, wherein the set top box is programmed to detect whether at least one mobile device is near the set top box and enable a standby mode when no mobile devices are presently registered with the set top box,
   wherein the set top box includes a processor, a low-noise block power module, a hard drive, and a device detector, wherein enabling the standby mode includes temporarily disabling the low-noise block power module to temporarily disable the low-noise block before temporarily disabling the hard drive,
   wherein the device detector is programmed to detect whether the at least one mobile device is near the set top box, remain enabled while the set top box is operating in the standby mode, and output a first signal to the processor when the device detector detects the at least one mobile device near the set top box,
   wherein the first signal wakes the processor from the standby mode and wherein the processor is programmed to wake at least one other component of the set top box from the standby mode in response to receiving the first signal.

2. The system of claim 1, wherein the device detector is programmed to wirelessly communicate with the at least one mobile device.

3. The system of claim 1, wherein the device detector is programmed to output a second signal, representing that no mobile devices are near the set top box, to the processor, wherein the set top box includes a delay circuit configured to receive the second signal from the processor and delay the standby mode a predetermined amount of time after-receiving the second signal from the processor.

4. The system of claim 1, wherein the set top box includes a peripheral device switch module and wherein enabling the standby mode includes temporarily disabling the peripheral device switch module before temporarily disabling the hard drive.

5. A method comprising:
   receiving, at a set top box, signals from a satellite receiver associated with a low-noise block;
   identifying at least one mobile device presently registered with the set top box;
   detecting, with a device detector incorporated into the set top box, whether at least one of the presently registered mobile devices is near the set top box;
   waking, via a first signal output by the device detector, a processor of the set top box from a standby mode when the device detector detects the at least one mobile device near the set top box;
   waking, via a command signal output by the processor, at least one other component of the set top box in response to the processor receiving the first signal; and
   enabling, via a second signal output by the device detector, the standby mode of the set top box when no registered mobile devices are presently registered with the set top box, wherein the device detector incorporated into the set top box remains enabled while the set top box is operating in the standby mode, and wherein enabling the standby mode includes temporarily disabling a low-noise block module that powers the low-noise block before temporarily disabling a hard drive incorporated into the set top box.

6. The method of claim 5, wherein detecting whether at least one mobile device is near the set top box includes wirelessly receiving a signal from the at least one mobile device at the set top box.

7. The method of claim 5, wherein enabling the standby mode includes outputting the second signal to a delay circuit, and wherein the standby mode is enabled a predetermined amount of time after the second signal is received by the delay circuit.

8. The method of claim 5, wherein enabling the standby mode includes temporarily disabling a peripheral device switch module prior to temporarily disabling the hard drive incorporated into the set top box.

9. The method of claim 5, wherein enabling the standby mode includes temporarily disabling at least one of a plurality of components associated with the set top box.

10. A set top box comprising:
    a media content interface device configured to receive media content signals;
    a device detector configured to detect at least one mobile device near the set top box based at least in part on whether the at least one mobile device is presently registered with the device detector, wherein the device detector is programmed to output a first signal when the at least one mobile device registers with the device detector and output a second signal when no mobile devices are registered with the device detector; and
    a processing device programmed to:
    wake from a standby mode and output a command signal to wake at least one other component of the set top box from the standby mode in response to receiving the first signal from the device detector, and enable the standby mode in response to receiving the second signal from the device detector, wherein the device detector is programmed to remain enabled during the standby mode;

a low-noise block power module configured to provide power to a low-noise block associated with a satellite receiver; and a hard drive, wherein enabling the standby mode includes temporarily disabling the low-noise block power module to temporarily disable the low-noise block associated with the satellite receiver, and wherein the low-noise block power module is temporarily disabled before temporarily disabling the hard drive.

11. The set top box of claim 10, wherein the device detector is configured to wirelessly communicate with the at least one mobile device.

12. The set top box of claim 10, further comprising a time delay module configured to receive the second signal from the processing device and delay enabling the standby mode by a predetermined amount of time after receiving the second signal.

13. The set top box of claim 10, further comprising a peripheral device switch module, wherein enabling the standby mode includes temporarily disabling the peripheral device switch module prior to temporarily disabling the hard drive.

14. The system of claim 1, wherein the device detector is programmed to identify the presently registered mobile devices based on an identification of mobile devices presently registered with a router.

15. The method of claim 5, further comprising receiving, at the device detector, a list of presently registered mobile devices from a router, and wherein identifying at least one mobile device presently registered with the set top box includes identifying at least one mobile device presently registered with the set top box based at least in part on the list received from the router.

* * * * *